US006988200B2

(12) United States Patent
Iwamoto

(10) Patent No.: US 6,988,200 B2
(45) Date of Patent: Jan. 17, 2006

(54) DATA TRANSMIT/RECEIVE DEVICE AND DATA TRANSMIT/RECEIVE METHOD

(75) Inventor: Kiyotaka Iwamoto, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 986 days.

(21) Appl. No.: 09/987,578

(22) Filed: Nov. 15, 2001

(65) Prior Publication Data

US 2002/0066015 A1 May 30, 2002

(30) Foreign Application Priority Data

Nov. 24, 2000 (JP) ............................ 2000-357542

(51) Int. Cl.
*G06F 17/00* (2006.01)

(52) U.S. Cl. ............................ 713/170; 726/3; 726/29

(58) Field of Classification Search ................ 726/2–4, 726/16–29; 713/170
See application file for complete search history.

(56) References Cited

U.S. PATENT DOCUMENTS 6,160,796 A 12/2000 Zou

FOREIGN PATENT DOCUMENTS

JP 7-250070 9/1995
JP 11-196110 7/1999
JP 2000-124928 4/2000

OTHER PUBLICATIONS

Multiple LSP routing network security for MPLS networking; Jong-Moon Chung; Panguluru, S.; Dongfang Liu; Garcia, R; Circuits and Systems, 2002. MWSCAS-2002. The 2002 45th Midwest Symposium on vol. 2, Aug. 4-7, 2002 pp.: II-605-II-608 vol. 2.*

Firewall placement in a large network topology; Smith, R.N.; Bhattacharya, S.; Distributed Computing Systems, 1997., Proceedings of the Sixth IEEE Computer Society Workshop on Future Trends of Oct. 29-31, 1997 pp. : 40-45.*

Intrusion detection in wireless ad hoc networks; Mishra, A.; Nadkarni, K.; Patcha, A.; Wireless Communications, IEEE (see also IEEE Personal Communications) vol. 11, Issue 1, Feb. 2004 pp. 48-60.*

"AV/C Digital Interface Command Set", Audio/Video Working Group of the 1394 Trade Association, Version 1.0, pp. 5-16, Sep. 1996.

* cited by examiner

*Primary Examiner*—David Jung
(74) *Attorney, Agent, or Firm*—McDermott Will & Emery LLP

(57) ABSTRACT

In a data transmit/receive method for plurality of devices connected by a 1394 bus, a receiving device obtains a device-specific number of a transmitting device when starting to receive data. When a bus reset occurs, the receiving device again obtains the device-specific number from the transmitting device, and checks whether the device-specific numbers before and after the bus reset match. If the device-specific numbers differ, the receiving device obtains the device-specific number from all devices connected to the bus. If a device with the same device-specific numbers as prior to the bus reset is present among the obtained device-specific numbers, the channel number of the bus used for the transmitting of data is determined, and the receiving device starts receiving with that channel number. Then device authentication with the transmitting device is carried out, and key information for solving the encryption is obtained.

9 Claims, 9 Drawing Sheets

DATA TRANSMIT/RECEIVE DEVICE AND DATA TRANSMIT/RECEIVE METHOD

BACKGROUND OF THE INVENTION

The present invention relates to a data transmit/receive device and a data transmit/receive method for transmitting/receiving digital data between a transmitting device and a receiving device.

Among conventional data transfer methods, there are methods using the IEEE1394 standard (IEEE: The Institute of Electrical and Electronic Engineers, Inc.) for example (see "IEEE1394 High Performance Serial Bus"). For data transfer with this IEEE1394 standard, there is isochronous communication, which is suitable for the transfer of synchronous data such as video signals or audio signals, and asynchronous communication, which is suitable for the transfer of non-synchronous data such as control signals, and both types of communication can be mixed on an IEEE1394 bus. Isochronous communication is so-called broadcasting-type communication, in which isochronous packets that a device on an IEEE1394 bus gives out can be received by all devices on that bus. By contrast, in asynchronous communication, there are the two types of peer-to-peer communication and broadcasting-type communication, and the asynchronous packets that a device on a bus outputs include an identifier indicating the device that is supposed to receive this packet. If this identifier indicates a specific device, then the device specified by the identifier receives the asynchronous packet, and if the identifier indicates broadcasting, then all devices on the bus receive this asynchronous packet.

FIG. 12 shows an isochronous packet, and FIG. 13 shows a CIP header in the isochronous packet of FIG. 12. The SID field 201 in the CIP header of FIG. 13 is the device identification number (referred to as "node number" in the following). The transmitting device transmitting the isochronous packet writes the node number that has been allotted at initialization of the IEEE1394 bus (referred to as "bus reset" in the following) into the CIP header 200 of the isochronous packet. The allotted node number is written into the SID field 201 in the CIP header 200. The number of the channel on which the data is transmitted is written into the channel field 101 of the isochronous packet.

The method for encrypted transmission of audio/video data (abbreviated as "AV data" in the following) on the IEEE1394 bus (in the following this method for encrypted transmission is referred to as "DTCP standard") is starting to be mapped out by DTLAs (digital transmission licensing administrators), and to be used for encrypted AV data transmission between AV devices. According to this DTCP standard, the transmitting device outputs AV data after subjecting it to an encryption. The receiving device receiving the encrypted data first requests authentication by the transmitting device. If this device authentication between transmitting device and receiving device has terminated normally, the receiving device can obtain an encryption key from the transmitting device. During the time after receiving the AV data from the transmitting device until obtaining the encryption key, the receiving device cannot decrypt the received AV data, but after obtaining the encryption key, the receiving device can decrypt the received AV data.

On the other hand, the IEC61883 standard (referred to as "AV protocol" in the following) adopted by the IEC (International Electrotechnical Commission) is a standard for transferring digital audio signals and digital video signals using the IEEE1394 standard, and administrating the connection of data transmission paths among devices linked to an IEEE1394 bus. In this AV protocol, audio and video data are transferred in isochronous packets. The isochronous packets include a CIP header (CIP: common isochronous packet). The CIP header includes identification information indicating the type of the audio and video data and information such as the device number of the transmitting device transmitting the isochronous packet.

Also, a group of commands for device control with the AV protocol is given by the AV/C command set (see "1394 Trade Association Specification for AV/C Digital Interface Command Set Version 1.0 Sep. 13, 1996"). These commands and their responses are transferred using asynchronous communication. In the AV protocol, if the channel that a transmitting device wants to use for output is already used for broadcast output on the IEEE1394 bus, then transmitting device forcibly stops this output, and instead starts its own output using this channel. At present, most of the devices on the market are designed for peer-to-peer connections, and use broadcasting for the transmitting of data. This is because there are no other devices transmitting data. From now on, however, there may be designs, in which some manufacturers' products stop the bus channels used by devices of other companies in order to guarantee the connection of the own company's product, and instead start to output data themselves using this channel. The following explains the problems that occur in this case.

For example, a case is examined in which a first TV set and a video deck are connected on a IEEE1394 bus. The first TV set transmits encrypted AV data using a predetermined channel of the bus, and the video deck receives these data, and obtaining an encryption key from the first TV set, correctly decrypts the received data. Under these circumstances, the video deck recognizes that the node number of the first TV set is a certain number (e.g. "1"). If in this situation, a second TV set is connected to the bus, this second TV set stops the data transmitting of the first TV set, and using the predetermined channel, starts to transmit encrypted AV data, then, assuming that the node number 1 becomes assigned to the second TV set instead of the first TV set by a bus reset that occurs when the second TV set is connected, the video deck looks up the channel number and the node number in the received isochronous packets to confirm whether the transmitting device has changed, so that the video deck cannot detect that the transmitting device has changed from the first TV set to the second TV set. As a result, even though the video deck receives encrypted data from the second TV set, it cannot correctly decrypt these encrypted data, because it has not obtained the encryption key for these data. As a result, the video deck cannot suitably reproduce the received data.

As a conventional means to solve this problem, JP H11-196110A proposes a method of recognizing corresponding devices from a topology map. The device configuration for this proposed method of recognizing devices from a topology map is shown in FIG. 10. In FIG. 10, numeral 607 denotes a 1394 LSI unit for transmitting/receiving packet data on a 1394 bus. Numeral 605 denotes an asynchronous transaction control unit for controlling communication using asynchronous packets. Numeral 606 denotes a topology configuration production unit, which obtains the hierarchical relation of the node numbers and physical ports from the Self ID packets, and calculates a pattern of the topology connected by the IEEE1394 bus. Numeral 604 denotes a topology change detection unit for detecting a change of the topology in the course of a bus reset, based on the information from the topology configuration production unit 606.

Numeral 603 denotes a buffer for holding information necessary for topology configuration production and topology change detection. Numeral 601 denotes a data transfer control unit for controlling the transfer of data. Numeral 602 denotes an authentication processing unit for device authentication between transmitting device and receiving device. The operation of this configuration is explained referring to the flowchart in FIG. 11.

In Step Sa in FIG. 11, the receiving device receives Self ID packets transmitted from each device. These Self ID packets are the packets that each device connected to the bus transmits by broadcasting after a bus reset, and they include a node number (physical ID) and a port status. The port status indicates for each port number such information as “connection to child node”, “connection to parent node”, “not connected to node”, or “no port”. At this Step Sa, the node numbers of the Self ID packets and the hierarchical relation of the ports are obtained. Then in Step Sb, the pattern of the topology connected to the IEEE1394 is calculated from the obtained hierarchical relation information. In Step Sc, after the calculation of the pattern of the topology, node numbers are assigned in order starting with the physical port of the root node with the smallest number, and topology information is produced and stored in the buffer 603.

After that, in Step Sd, the receiving device determines whether a bus reset has occurred while receiving, and if there was no bus reset, then the receiving device continues to receives whereas if there was a bus reset, then at Step Se, it receives the Self ID packets transmitted out by all devices connected to the IEEE1394 bus after the bus reset, and obtains the node numbers and the hierarchical relation of the physical ports contained in the Self ID packets. Then, in Step Sf, the pattern of the topology connected to the IEEE1394 bus is calculated from the obtained hierarchical relation information. After the calculation of the pattern of the topology, in Step Dg, node numbers are assigned in order starting with the physical port of the root node with the smallest number, and new topology information is produced. After that, in Step Sh, the new topology information is compared to the topology information that had been produced before. Then in Step Si, based on the result of the comparison of the topology information, the receiving device confirms the node number of the transmitting device that had been transmitting originally, and continues to receive data from this original transmitting device.

Consequently, with this proposed method, new topology information is produced after the bus reset, so that the reception of data from the original transmitting device can be continued, and if the transmitted data is encrypted, then the received data can be decrypted if the encryption key is obtained again from the original transmitting device.

However, with this conventional method, the topology information is produced based on the Self ID packets, which include the node information and the port status, so that the process for producing the topology information is very complex, and its load on the system is high. In particular as the number of devices connected to the IEEE1394 bus and the number of physical ports increases, more time is needed to produce the topology information, and also for the comparison of the topology information, more time is needed for the judgment which devices have been newly connected to or disconnected from the bus, as the topology configuration becomes more complex. As a result, a certain time is needed until the transmitting device that had been transmitting originally is recognized. If the real-time audio/video data received by a TV set or the like has been received by the receiving device, this audio/video data has to be recorded by the receiving device in real-time without loss, so that it is a serious problem when the time needed to again recognize that the TV set or the like is the transmitting device is too long.

Furthermore, considering the case that 63 devices are connected to the bus, then about 10 kbyte are needed for the calculation of the pattern of the topology, about 20 kbyte are needed for the topology information production process, and 8 to 252 byte are needed for the buffer 603, so that there is the problem that it is necessary to use a large storage capacity.

SUMMARY OF THE INVENTION

It is a first object of the present invention that, when a receiving device that is receiving encrypted data transmitted by a transmitting device receives data from another transmitting device due to a change of topology, the receiving device obtains a decryption key for the received data, so that it can decrypt the data in a predetermined manner.

It is a second object of the present invention that if due to a change of topology a receiving device receives data from another transmitting device, then the transmitting device that had been transmitting data originally is recognized easily and with little processing, and that the receiving device can receive the original data is achieved with a configuration with little storage capacity.

In order to attain the first and the second object, the present invention exploits the device-specific information of the devices connected to the bus, and based on this device-specific information, judges and recognizes the transmitting device that had been transmitting data originally as well as a transmitting device that has newly started to transmit.

That is to say, a data transmit/receive device in accordance with the present invention, in which a plurality of devices having a data transmission function or a data receiving function and an asynchronous communication function are connected to a bus, is characterized in that each of the plurality of devices has its own device-specific information as well as a function for reading other device-specific information, and each of the plurality of devices comprises a recognition unit that, if a device having the data transmission function or the data receiving function, the asynchronous communication function, and the reading function but not belonging to said plurality of devices has been added as a transmitting device within a topology showing the connection among said plurality of devices while a device functioning as a receiving device transmits/receives data to/from another transmitting device, recognizes with the reading function the transmitting device that had been transmitting data originally, and continues the transmitting/receiving of data to/from this confirmed transmitting device.

A data transmit/receive device in accordance with the present invention, in which a plurality of devices having a data transmission function or a data receiving function and an asynchronous communication function are connected to a bus, and real-time data are transmitted/received between two of said plurality of devices, is characterized in that each of the plurality of devices has its own device-specific information as well as a function for reading other device-specific information, and each of the plurality of devices comprises a recognition unit that, if a device having the data transmission function or the data receiving function, the asynchronous communication function, and the reading function but not belonging to said plurality of devices has been added as a transmitting device within a topology showing the connection among said plurality of devices while a device functioning as a receiving device transmits/receives data to/from another transmitting device, recognizes with the reading function the transmitting device that had been transmitting data originally, and continues the transmitting/receiving of data to/from this confirmed transmitting device.

A data transmit/receive method in accordance with the present invention, in which a plurality of devices which have a data transmission function or a data receiving function and an asynchronous communication function are connected to a bus, is characterized in that each of the plurality of devices has its own device-specific information as well as a function for reading other device-specific information, the method including, if a device having the data transmission function or the data receiving function, the asynchronous communication function, and the reading function but not belonging to said plurality of devices has been added as a transmitting device within a topology showing the connection among said plurality of devices while a device functioning as a receiving device transmits/receives data to/from another transmitting device, recognizing with the reading function the transmitting device that had been transmitting data originally, and continuing the transmitting/receiving of data with this recognized transmitting device.

A data transmit/receive method in accordance with the present invention, in which a plurality of devices which have a data transmission function or a data receiving function and an asynchronous communication function are connected to a bus, and real-time data are transmitted/received between two of said plurality of devices, is characterized in that each of the plurality of devices has its own device-specific information as well as a function for reading other device-specific information, the method including if a device having the data transmission function or the data receiving function, the asynchronous communication function, and the reading function but not belonging to said plurality of devices has been added as a transmitting device within a topology showing the connection among said plurality of devices while a device functioning as a receiving device transmits/receives data to/from another transmitting device, recognizing with the reading function the transmitting device that had been transmitting data originally, and continuing the transmitting/receiving of data with this recognized transmitting device.

A data transmit/receive method in accordance with the present invention, is characterized in that when at least one transmitting device and one receiving device are connected to a bus, after the receiving device has read in device-specific device information from said transmitting device, data are received by the receiving device from the transmitting device via the bus, when another transmitting device is connected to the bus while the transmitting device and the receiving device transmit/receive data causing a bus reset, the receiving device reads in device-specific information from the transmitting device that is transmitting data, and compares this read-in device-specific information with the previously read-in device-specific information, if the transmitting device that is transmitting data is different from the transmitting device that had been transmitting data originally, then the receiving device reads out the device-specific information of all devices connected to the bus, compares the device-specific information with the previously read-in device-specific information, and recognizes the transmitting device that had been transmitting data originally, then, if the transmitting device that had been transmitting data originally is transmitting data, the receiving device continues the receiving of data from the transmitting device that had been transmitting data originally.

In this data transmit/receive method, it is preferable that the data that the transmitting device transmits to the receiving device are encrypted; after receiving the data from the transmitting device, the receiving device obtains decryption information with a device authentication process; and after the receiving device continues the receiving of data from the transmitting device that had been transmitting data originally, the receiving device again obtains decryption information with a device authentication process.

In this data transmit/receive method, it is preferable that the receiving device stops receiving when the result of comparing the device-specific information of all devices connected to the bus with the previously read-in device-specific information is that the transmitting device of the previously read-in device-specific information is not present.

In this data transmit/receive method, it is preferable that the bus has a plurality of channels; and when the receiving device has recognized the transmitting device that had been transmitting data originally by comparison of device-specific information, and when the recognized transmitting device has continued transmitting on a channel that is different from the channel on which it had been transmitting originally, then the receiving device continues the receiving on a different channel.

A data transmit/receive method in accordance with the present invention, is characterized in that when at least one transmitting device and one receiving device are connected to a bus, after the receiving device has read in device-specific device information from said transmitting device, the receiving device receives encrypted data from the transmitting device via the bus, and obtains decryption information with a device authentication process; then, when another transmitting device is connected to the bus while the transmitting device and the receiving device transmit/receive data causing a bus reset, the receiving device reads in device-specific information from the transmitting device that is transmitting data, and compares this read-in device-specific information with the previously read-in device-specific information; if the transmitting device that is transmitting data is different from the transmitting device that had been transmitting data originally, then the receiving device reads out the device-specific information of all devices connected to the bus, compares the device-specific information with the previously read-in device-specific information, and recognizes the transmitting device that had been transmitting data originally; then, if the transmitting device that had been transmitting data originally is transmitting data, the receiving device continues the receiving of data from the transmitting device that had been transmitting data originally, and again obtains decryption information with a device authentication process.

Thus, with the present invention, the receiving device obtains device-specific information, such as a device-specific number of the transmitting device when starting to receive data, and then, when a bus reset occurs, the receiving device obtains the device-specific information again from the transmitting device, and confirms whether the device-specific information before the bus reset matches with the device-specific information after the bus reset. Then, if the device-specific information does not match, that is, if the transmitting device serving as the communication partner of the receiving device has changed with the bus reset, the receiving device obtains the device-specific information from all devices connected to the bus, and if among the obtained device-specific information there is the transmitting device with the same device-specific information as before the bus reset, then the receiving device confirms whether the transmitting device is transmitting data, and if it is transmitting data, then it switches the channel and continues the data reception. Consequently, even if the transmitting device serving as the communication partner of the receiving device changes due to a bus reset, the original transmitting device is recognized, and the reception of the original data can be suitably continued.

In particular, if the transmitting device encrypts the data that are being transmitted, and if the receiving device again obtains the key information for solving the encryption by performing the device authentication with the transmitting device again, then it can continue to decrypt the encrypted data that are transmitted by the original transmitting device.

Here, the receiving device can judge and recognize the original transmitting device correctly, simply by comparing the device-specific information before and after a bus reset, so that compared to a judgment and recognition based on Self ID packets as in the prior art, the reception of the original data can be continued easier, with less processing, and with much less storage capacity than in the prior art.

Furthermore, in the present invention, if the receiving device cannot receive the data from the original transmitting device due to a bus reset, then an authentication process with another transmitting device transmitting new data is performed, and encryption information is obtained from that transmitting device, so that the newly received data can be decrypted.

DETAILED DESCRIPTION OF THE INVENTION

The following is a detailed description of preferable embodiments of the present invention, with reference to the accompanying drawings.

First Embodiment

Figure 1:
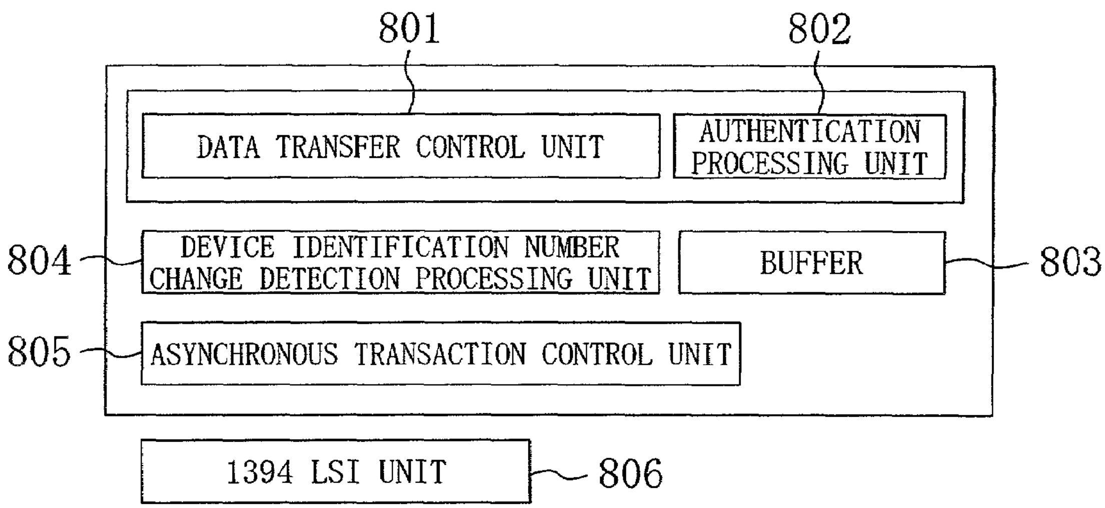
FIG. 1 shows the overall configuration of a data transmit/receive device of a first embodiment of the present invention.

FIG. 1 shows the overall configuration of a data transmit/receive device of the first embodiment. In FIG. 1, numeral 806 denotes a 1394 LSI unit for transmitting/receiving packet data over a 1394 bus. Numeral 805 denotes an asynchronous transaction control unit for controlling communication using asynchronous packets. Numeral 804 denotes a device identification number change detection processing unit, which requests device-specific numbers as device-specific information, and based on the obtained device-specific numbers, detects changes in the transmitting device that is the communication partner of the receiving device, before and after a bus reset. Numeral 803 denotes a buffer for holding device-specific information that is necessary for the detection of changes of the transmitting device that is the communication partner. Numeral 801 denotes a data transfer control unit for controlling the transfer of data. Numeral 802 denotes an authentication processing unit for device authentication between transmitting device and receiving device.

Figure 2:
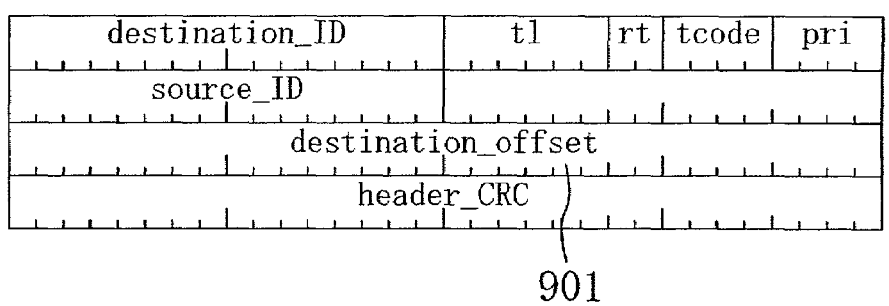
FIG. 2 shows the packet format of a quadlet read request in the data transmit/receive method of the first embodiment.
Figure 3:
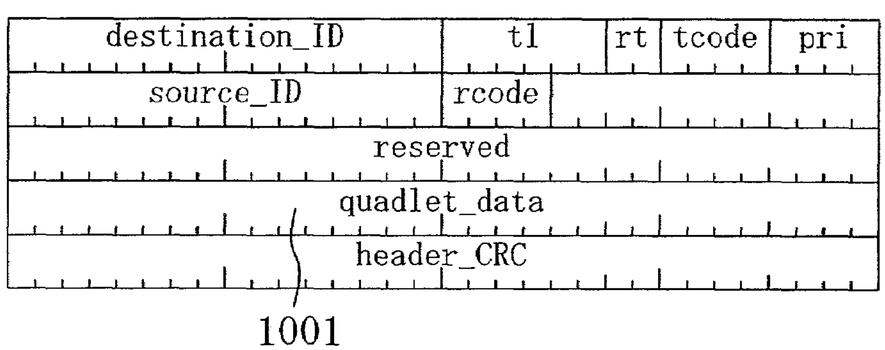
FIG. 3 shows the packet format of a quadlet read response in the data transmit/receive method of the first embodiment.

FIGS. 2 and 3 show the packet format that is used for obtaining the device-specific numbers (device-specific information). FIG. 2 shows the packet format of a quadlet read request, and FIG. 3 shows the packet format of a quadlet read response. The receiving device obtains device-specific numbers by quadlet read requests and quadlet read responses of asynchronous packets.

Figure 4:
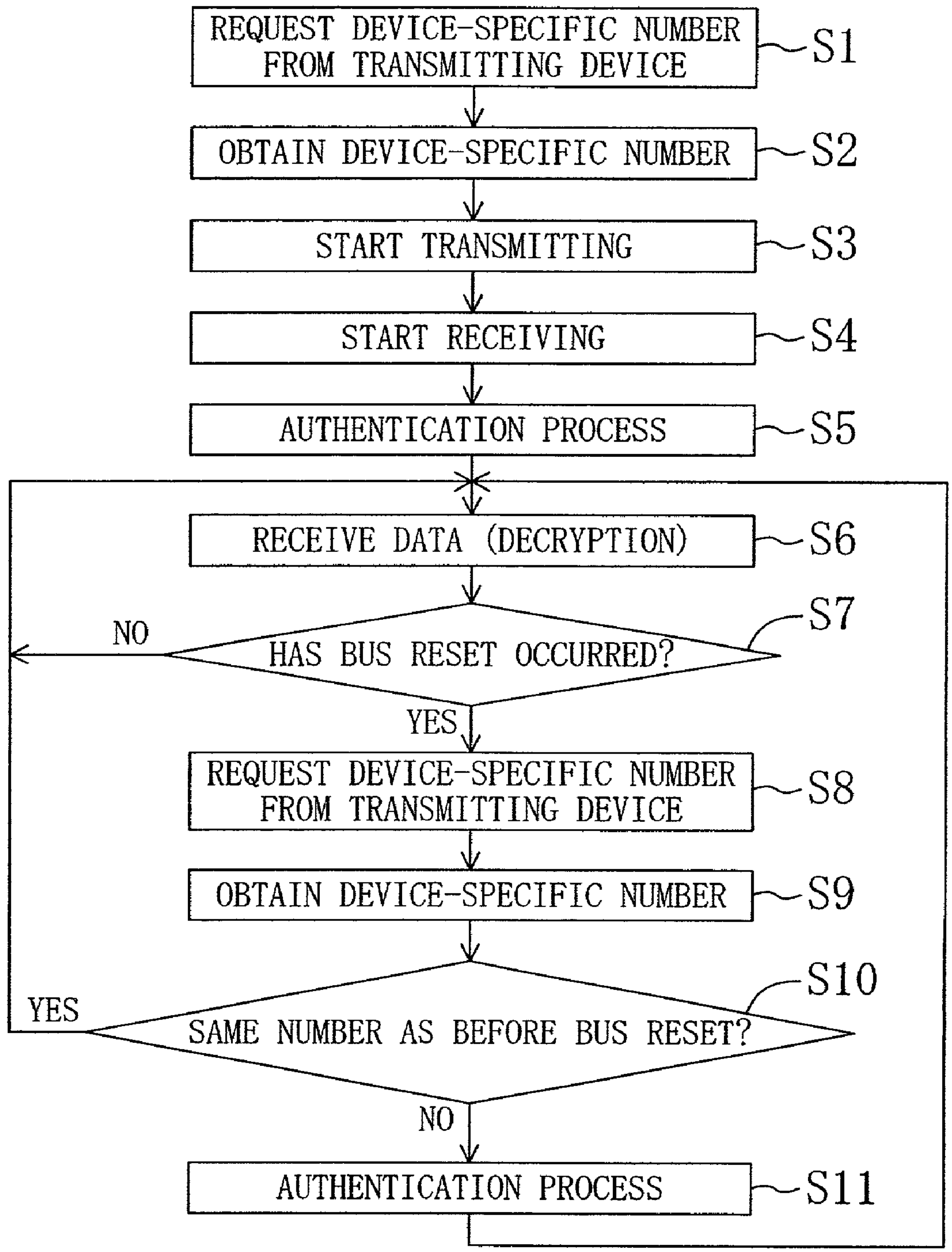
FIG. 4 is a flowchart illustrating the procedure of the data transmit/receive method of the first embodiment.

Referring to the flowchart in FIG. 4, the following is an explanation of a data transmit/receive method using the data transmit/receive device of the present embodiment.

As shown in FIG. 4, before the receiving device starts to receive isochronous packet data from a transmitting device that is transmitting on the channel that the receiving device wants to receive, in Step S1 the receiving device makes a quadlet read request to obtain the device-specific number from the transmitting device. At this time, the receiving device writes "FFFFF000040C" in hexadecimal notation into the destination offset 901 in the quadlet read request, and transmits it. The transmitting device receives the quadlet read request in FIG. 2 from the receiving device, and judging from the information that has been written into the destination offset 901 that it is a request to obtain the device-specific number, writes the device-specific number that has previously been written into the configuration ROM of the actual device into the quadlet data 1001 in the quadlet read response in FIG. 3, and transmits it off. In Step S2, the receiving device receives the quadlet read response from the transmitting device, obtains the device-specific number from the quadlet data 1001, and stores the obtained device-specific number in the buffer 803 in the receiving device.

Figure 5:
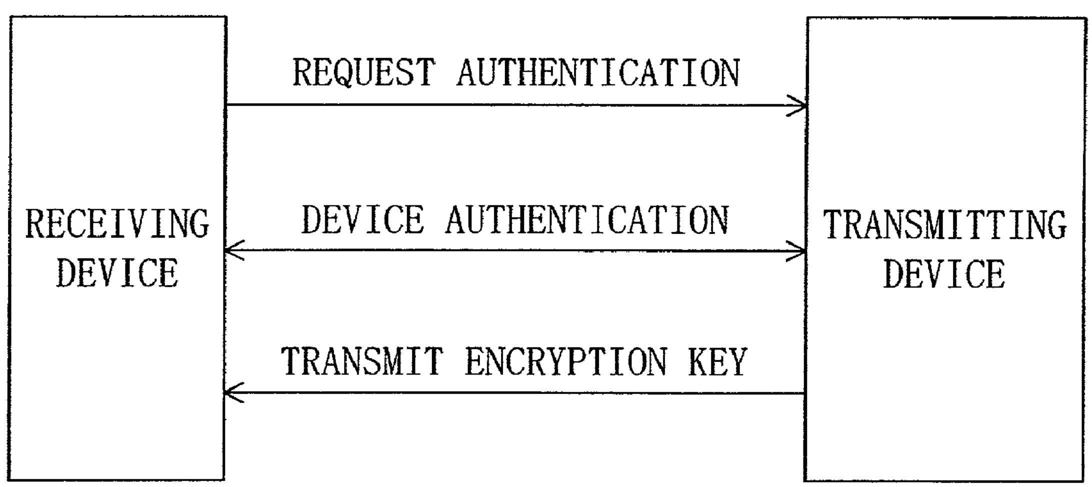
FIG. 5 illustrates a device authentication process between transmitting device and receiving device in the data transmit/receive method of the first embodiment.

Then in Step S3, the transmitting device encrypts the data and starts to transmit the encrypted data, and at Step S4, the receiving device starts to receive the data. After starting to receive the data, the receiving device first, as shown in FIG. 5, first requests authentication from the transmitting device in Step S5, and if this device authentication between the transmitting device and the receiving device has been terminated normally, then the encryption key is transmitted from the transmitting device to the receiving device, so that in Step S6, the receiving device decrypts the received data using the received encryption key.

Then in Step S7, the receiving device determines whether a bus reset has occurred during the reception of data, and if there was no bus reset, then the receiving device continues to receive data, whereas if there was a bus reset, the procedure advances to Step S8, and the receiving device requests the obtaining of the device-specific number from the transmitting device that is transmitting the isochronous packets that are being received. The transmitting device that has received the request for the device-specific number transmits its own device-specific number to the requesting device.

In Step S9, the receiving device obtains the device-specific number from the transmitting device, and then in Step S10, the receiving device confirms whether the obtained device-specific number matches the device-specific number of the transmitting device prior to the bus reset. If the device-specific numbers match, the receiving device continues to receive. On the other hand, if the device-specific numbers differ, it is concluded that the transmitting device serving as the communication partner has changed to another transmitting device, and in Step S11, the receiving device performs device authentication with the new transmitting device serving as the communication partner, obtains the data encryption key from that transmitting device, and decrypts the data that are being received.

Thus, with this embodiment, even when the communication partner of the receiving device has changed due to a bus reset, the receiving device determines whether the transmitting device serving as the communication partner has changed by comparing the device-specific numbers before and after the bus change, and if the transmitting device serving as the communication partner has changed, the receiving device obtains the encryption information from the transmitting device serving as the new communication partner, and can correctly decrypt the data from the new transmitting device. Furthermore, the device costs can be reduced.

Also, to check whether the communication partner has changed, it is sufficient that the receiving device obtains the device-specific number from the new communication partner, and compares the device-specific numbers before and after the bus reset, so that checking whether the communication partner has changed can be performed easier and in less time than conventionally.

Second Embodiment

The following is an explanation of a second embodiment of the present invention. This embodiment is considered the best mode for carrying out the present invention. The overall configuration of the data transmit/receive device of this embodiment is the same as in FIG. 1, so that further illustrations and explanations have been omitted. However, the operation of this embodiment is different from that of the first embodiment. The following explains the data transmit/receive method of this embodiment, with reference to the flowchart in FIG. 6.

Figure 6:
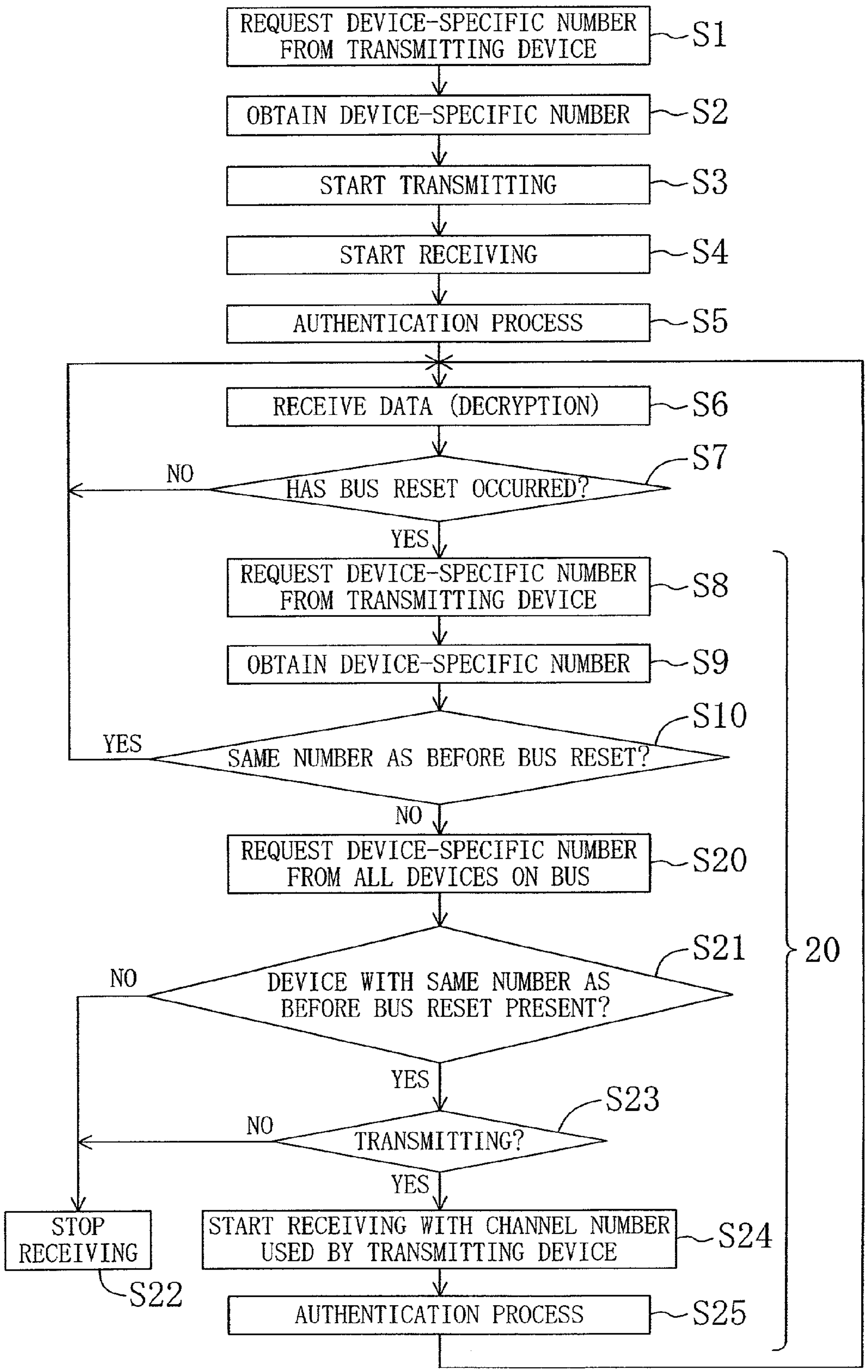
FIG. 6 is a flowchart illustrating the procedure of the data transmit/receive method of a second embodiment.

In Steps S1 and S2 of FIG. 6, the device-specific numbers of the devices are read in (function for reading device-specific numbers). That is to say, before the receiving device starts to receive asynchronous packet data from a transmitting device that is transmitting data on the channel that the receiving device wants to receive, in Step S1 the receiving device requests the device-specific number from the transmitting device with the quadlet read request in FIG. 2. At this time, the receiving device writes "FFFFF000040C" in hexadecimal notation into the destination offset 901 in the quadlet read request, and transmits it. The transmitting device receives the quadlet read request from the receiving device, and judging from the information that has been written into the destination offset 901 included therein that it is a request to obtain the device-specific number, writes the device-specific number that has previously been written into the configuration ROM of the actual device into the quadlet data 1001 of the quadlet read response in FIG. 3, and transmits it. In Step S3, the receiving device receives the quadlet read response from the transmitting device, obtains the device-specific number from the quadlet data 1001, and stores the obtained device-specific number in the buffer 803 in receiving device.

Then in Step S3, the transmitting device encrypts the data and starts to transmit the encrypted data, and at Step S4, the receiving device starts to receive the data from the transmitting device. After starting to receive the data, in Step S5 a device authentication process is performed between the transmitting device and the receiving device, and the encryption key is transmitted from the transmitting device as encryption information to the receiving device. In Step S6, the receiving device decrypts the received data using the received encryption key.

Then in Step S7, the receiving device determines whether a bus reset has occurred during the reception of data, and if there was no bus reset, then the receiving device continues to receive data. If, on the other hand, there was a bus reset, the procedure advances to Step S8, and the receiving device requests the obtaining of the device-specific number from the transmitting device that is transmitting the isochronous packets that are being received. The transmitting device that has received the request for the device-specific number transmits its own device-specific number to the requesting device, and at Step S9, the receiving device obtains the device-specific number from this transmitting device.

In Step S10, after the receiving device has obtained the device-specific number from the transmitting device, the receiving device checks whether the obtained device-specific number matches the device-specific number of the transmitting device serving as communication partner prior to the bus reset. If the device-specific numbers match, it is concluded that the communication partner is the same before and after the bus reset, and the receiving device continues to receive.

On the other hand, if the device-specific numbers do not match, the receiving device concludes that the transmitting device serving as the communication partner has been changed to another transmitting device due to the bus reset, and in Step S20, the receiving device requests the device-specific numbers of all transmitting devices on the IEEE1394 bus. The devices receiving this request for device-specific numbers transmit the device-specific number written into the configuration ROM of the actual device to the device that has requested the device-specific number. In Step S21, the receiving device checks from the obtained device-specific numbers whether the transmitting device serving as the communication partner before the bus reset is present on the bus, and if it is not present, then the data reception stops at Step S22. On the other hand, if it is present, then at Step S23, it is checked whether the transmitting device serving as the communication partner before the bus reset is still transmitting. If it is not transmitting, then at Step S22, the reception is stopped, and if it is transmitting, then at Step S24, this is regarded as a situation in which the channel has been taken away from the transmitting device serving as the communication partner before the bus reset by the transmitting device serving as the communication partner after the bus reset, so that the data transmission continues using another channel, and the receiving device starts to receive the data from the transmitting device serving as the communication partner before the bus reset on this other channel. Then at Step S25, device authentication is performed between the receiving device and the transmitting device serving as communication partner, and after again obtaining the encryption key from the transmitting transmitting device (that is, the transmitting device serving as the communication partner before the reset), the received data are correctly decrypted.

The Steps S7 to S10 and S20 to S25 in FIG. 6 constitute a recognition unit 20, which, when a transmitting device has been added within the topology and a bus reset has been performed, recognizes the transmitting device that was originally transmitting the audio/video data based on its device-specific number, and continues the transmitting/receiving of audio/video data between the recognized transmitting device and the receiving device to which the recognition unit 20 belongs.

Figure 7:
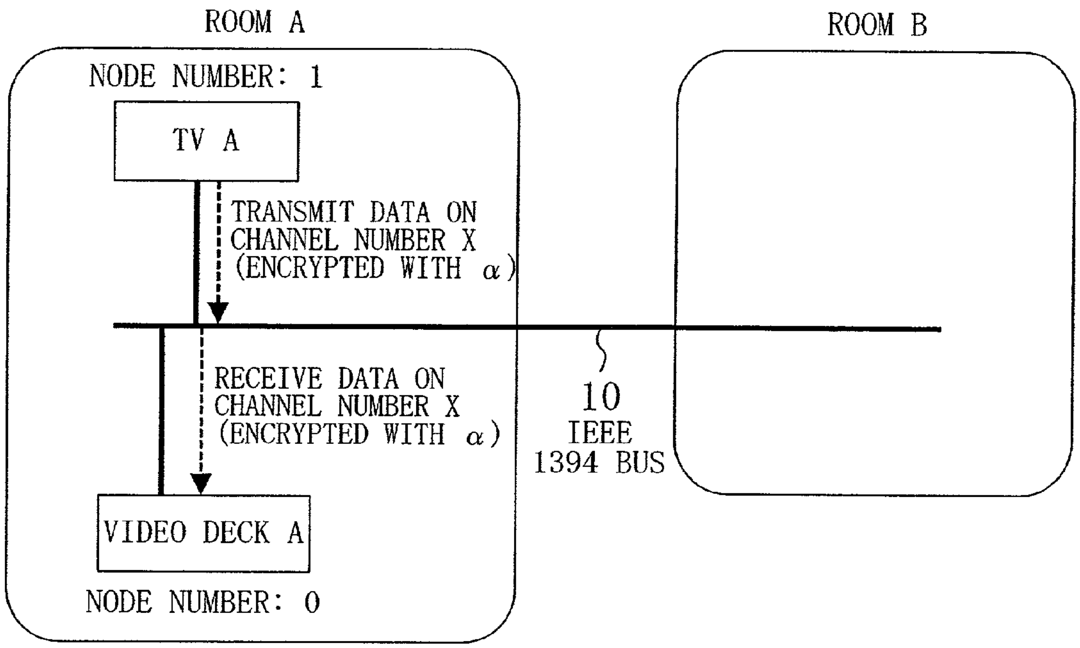
FIG. 7 shows an example of an IEEE1394 bus configuration in the data transmit/receive device of the second embodiment.

The following is a specific explanation of a data transmit/receive method in accordance with this embodiment. As shown in FIG. 7, a room A and a room B are linked over a network having an IEEE1394 bus 10. In room A, a video deck A and a TV set A are connected to the bus 10. Let the node number of the video deck A be 0 and let the node number of the TV set A be 1. The TV set A is a transmitting device than can encrypt and transmit data, and transmits encrypted real-time audio/video data over a channel with the number X. Acting as the receiving device, the video deck A receives the AV data on the channel with the number X that the transmitting device TV set A is transmitting.

Figure 13:
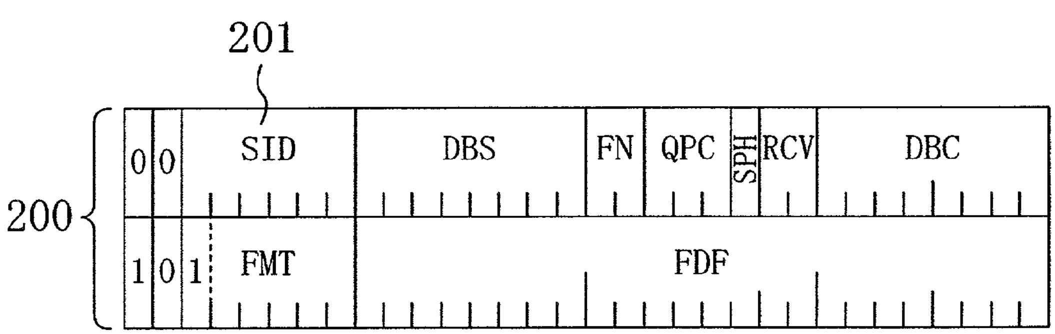
FIG. 13 illustrates the format of the CIP header in the conventional data transmit/receive device.

In order to perform the decryption of the received AV data, the video deck A requests authentication from the TV set A, and when the device authentication between the video deck A and the TV set A has been carried out correctly, the video deck A obtains the encryption key that is used by the TV set A, and the video deck A correctly decrypts the received data. Here, the video deck A looks up the SID field 201 (see FIG. 13) in the received isochronous packet of FIG. 13, and recognizes that the node number of the transmitting device is "1".

Figure 8:
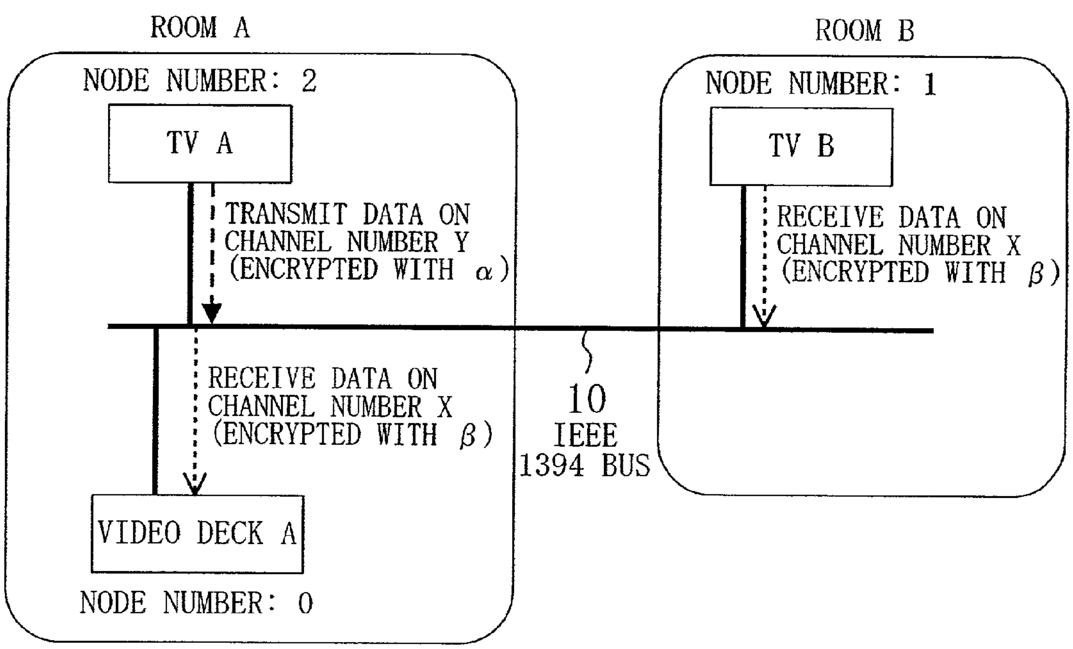
FIG. 8 shows an example of an IEEE1394 bus configuration after bus reset in the data transmit/receive device of the second embodiment.

The following examines the case that in this situation, as shown in FIG. 8, a TV set B is connected to the IEEE1394 bus 10 in room B, this TV set B is added as a transmitting device within the topology showing the device connections in FIG. 7, and the TV set B starts to transmit encrypted audio/video data. With this connection, when the TV set B forcibly stops the output of the channel with the number X that the TV set A is using to transmit AV data, and starts to transmit AV data using the channel with the number X in its place, the channel with the number X is taken away from the TV set A by the TV set B, so that it may happen that the TV set A continues the transmitting of AV data on a channel with the number Y, for example.

The node numbers that have been assigned to the devices are reassigned due to a bus reset that occurs when the TV set B is connected. Therefore, it occurs that the node numbers of the devices before and after the bus reset are changed. Here, let us assume that the node number 1 is assigned to the TV set B. Conventionally, the video deck A checks the channel number and the node number in the received isochronous packets, and confirms whether the transmitting device serving as communication partner has changed, so that in a situation as shown in FIG. 8, in which after the bus reset the TV set B has the same node number and the same channel number as the TV set A before the bus reset, the video deck cannot detect that the transmitting device serving as the communication partner has changed from the TV set A to the TV set B. With this embodiment, however, due to the bus reset, the video deck A requests the device-specific number from the TV set B serving as the communication partner, and since this device-specific number does not match with the device-specific number prior to the bus reset, the video deck can recognize that the communication partner has changed with the bus reset. As a result, the video deck A requests all devices on the bus 10 to transmit their device-specific numbers, and can recognize the device whose device-specific number matches with the device-specific number in the buffer 803, which has been obtained before the bus reset, in other words the TV set A. Consequently, the video deck A again acquires the encryption key by performing an authentication process with the TV set A serving as the communication partner before the bus reset, and switching the channel from number X to number Y, the video deck can receive the encrypted AV data from the TV set A that it is supposed to receive, and can decrypt these data correctly.

In this embodiment, it is determined by comparing the device-specific numbers before and after the bus reset whether the transmitting device serving as the communication partner has changed, and the transmitting device serving as the communication partner before the bus reset is recognized, so that compared to the case of producing the topology information as in the prior art, these transmitting device changes and the communication partners before the bus reset can be determined and recognized with little processing. Consequently, also the size of the buffer 803 can be kept down to four bytes.

Third Embodiment

The following is an explanation of the third embodiment. This embodiment illustrates a case where the data from the transmitting device are not encrypted.

Figure 9:
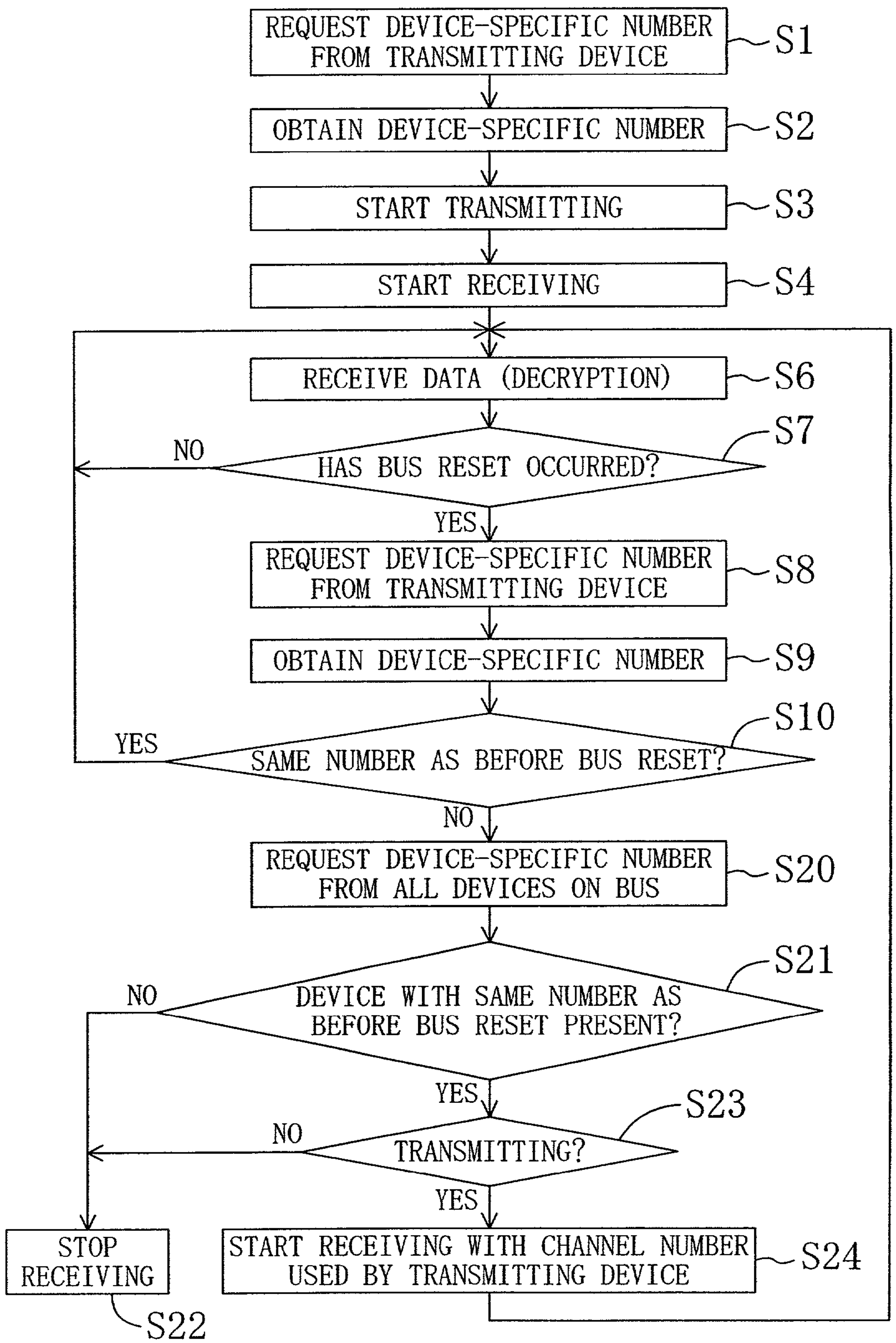
FIG. 9 is a flowchart illustrating the procedure of the data transmit/receive method of a third embodiment.
Figure 10:
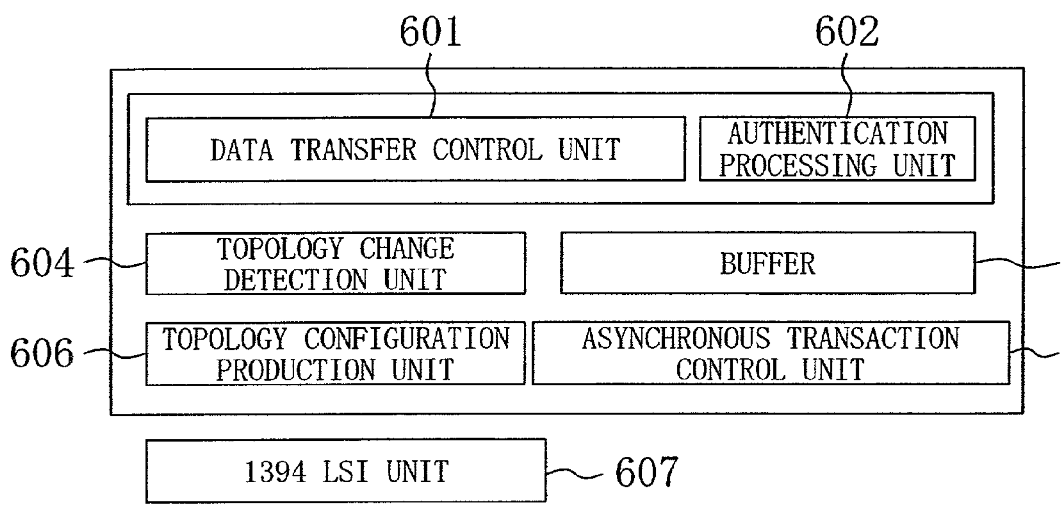
FIG. 10 illustrates the overall configuration of a conventional data transmit/receive device.
Figure 11:
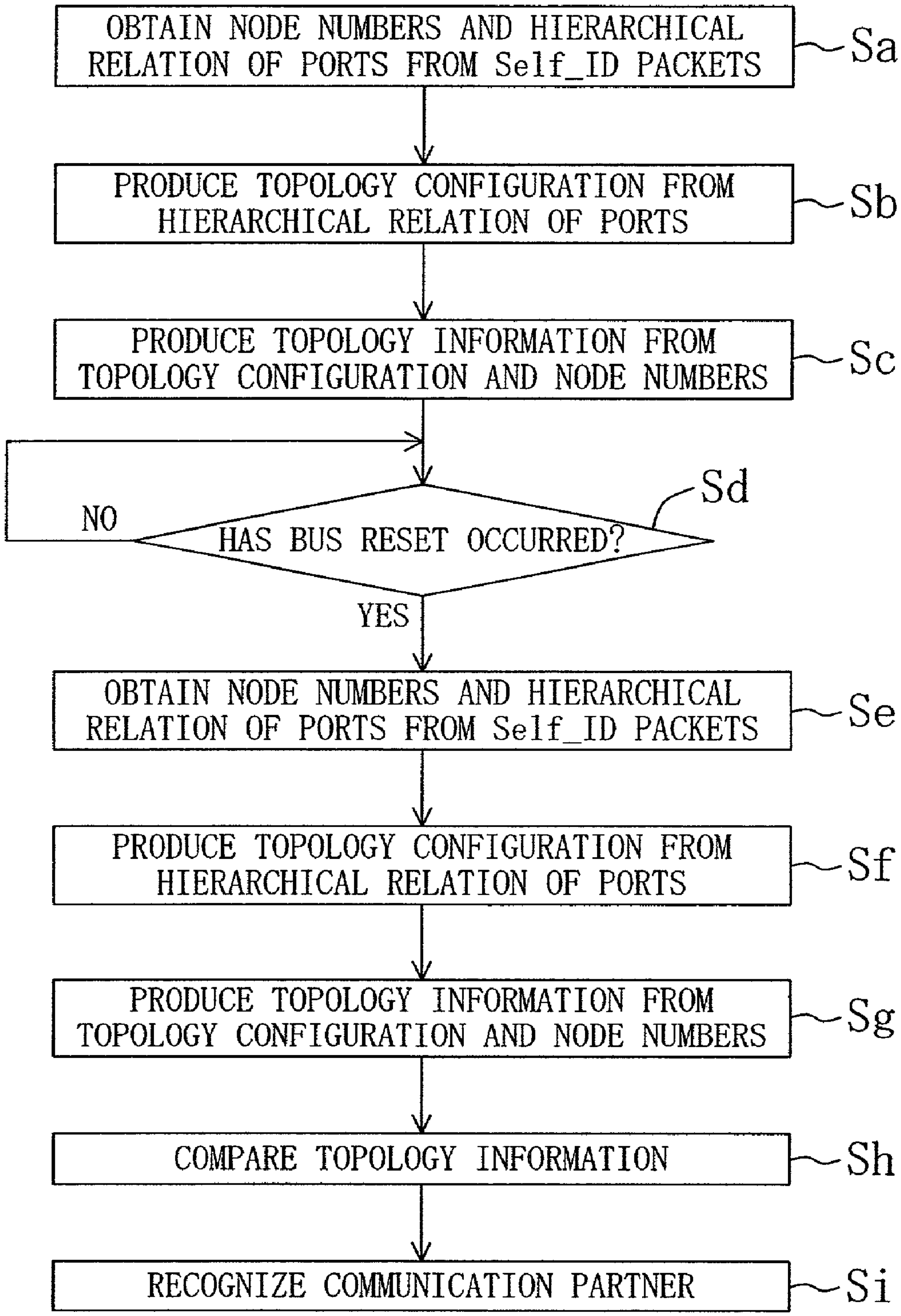
FIG. 11 is a flowchart illustrating the procedure of the conventional data transmit/receive device.
Figure 12:
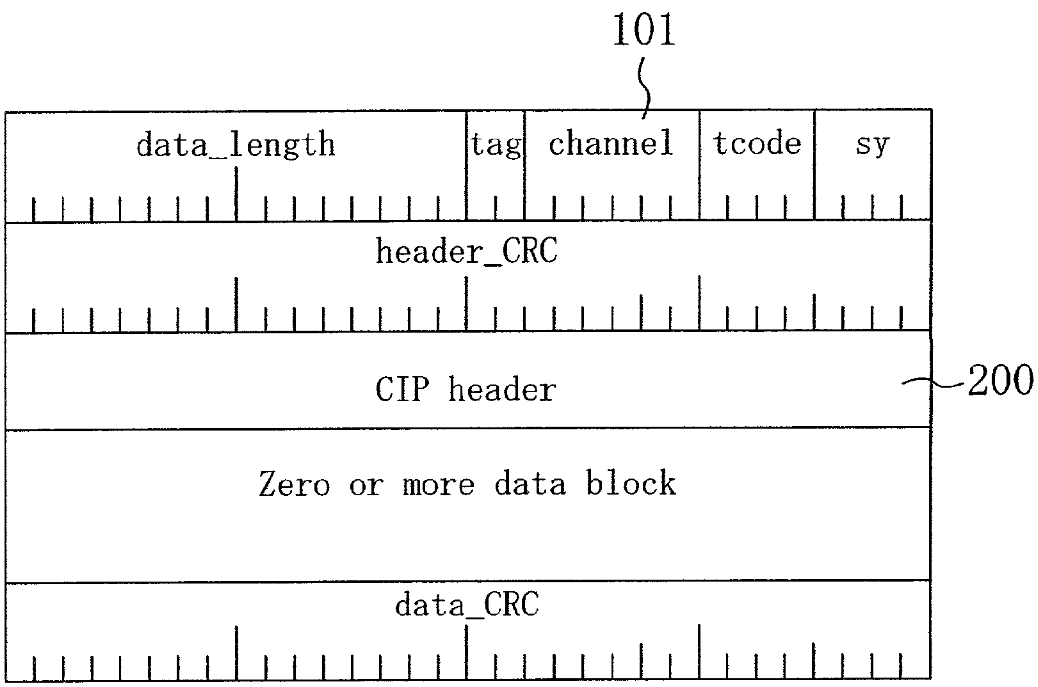
FIG. 12 illustrates the format of an isochronous packet in the conventional data transmit/receive device.

FIG. 9 is a flowchart showing the data transmit/receive method of this embodiment. The overall configuration of the data transmit/receive device of this embodiment is the same as in FIG. 1, so that further illustrations and explanations have been omitted. The flowchart in FIG. 9 is basically the same as the flowchart of the second embodiment shown in FIG. 6, but the authentication processes of Step S5 and Step S25 of FIG. 6 have been omitted. The rest of the data transmit/receive method is the same as in the second embodiment, so that further explanations of the flowchart in FIG. 9 have been omitted.

Explaining the data transmit/receive method of this embodiment with FIG. 7 and FIG. 8, if a TV set B is connected to the bus 10 while the video deck A receives unencrypted data from the TV set A on a channel with the number X of the bus 10, then, when the unencrypted data from the TV set B is forcibly transmitted on the channel with the number X, the TV set A starts to continuously transmit data using the channel with the number Y, and on the other side, the video deck A starts to receive and record the data from the TV set B. The received data are not encrypted, so that they can be reproduced correctly, but they are not the data that are supposed to be recorded. The video deck A checks in the same manner as in the second embodiment whether the transmitting device serving as the communication partner has changed due to a bus reset, and determines and recognizes the transmitting device serving as the communication partner before the bus reset by its device-specific number. The video deck A switches the channel receiving the data to the channel with the number Y, and changing the communication partner from TV set B to TV set A, continues to receive data from the TV set A. Consequently, regardless of a bus reset, the video deck A can receive and reproduce the data from the TV set A that it is supposed to record.

The invention may be embodied in other specific forms without departing from the spirit or essential characteristics thereof. The embodiments disclosed in this application are to be considered in all respects as illustrative and not restrictive, the scope of the invention being indicated by the appended claims rather than by the foregoing description. All changes that come within the meaning and range of equivalency of the claims are intended to be embraced therein.

What is claimed is:

1. A data transmit/receive device, in which a plurality of devices having a data transmission function or a data receiving function and an asynchronous communication function are connected to a bus, wherein each of the plurality of devices has its own device-specific information as well as a function for reading other device-specific information; and wherein each of the plurality of devices comprises a recognition unit that, if a device having the data transmission function or the data receiving function, the asynchronous communication function, and the reading function but not belonging to said plurality of devices has been added as a transmitting device within a topology showing the connection among said plurality of devices while a device functioning as a receiving device transmits/receives data to/from another transmitting device, recognizes with the reading function the transmitting device that had been transmitting data originally, and continues the transmitting/receiving of data to/from this confirmed transmitting device.

2. A data transmit/receive device, in which a plurality of devices having a data transmission function or a data receiving function and an asynchronous communication function are connected to a bus, and real-time data are transmitted/received between two of said plurality of devices, wherein each of the plurality of devices has its own device-specific information as well as a function for reading other device-specific information; and wherein each of the plurality of devices comprises a recognition unit that, if a device having the data transmission function or the data receiving function, the asynchronous communication function, and the reading function but not belonging to said plurality of devices has been added as a transmitting device within a topology showing the connection among said plurality of devices while a device functioning as a receiving device transmits/receives data to/from another transmitting device, recognizes with the reading function the transmitting device that had been transmitting data originally, and continues the transmitting/receiving of data to/from this confirmed transmitting device.

3. A data transmit/receive method, in which a plurality of devices which have a data transmission function or a data receiving function and an asynchronous communication function are connected to a bus, wherein each of the plurality of devices has its own device-specific information as well as a function for reading other device-specific information;

the method comprising:

if a device having the data transmission function or the data receiving function, the asynchronous communication function, and the reading function but not belonging to said plurality of devices has been added as a transmitting device within a topology showing the connection among said plurality of devices while a device functioning as a receiving device transmits/receives data to/from another transmitting device, said receiving device recognizing with the reading function the transmitting device that had been transmitting data originally; and said receiving device continuing the transmitting/receiving of data to/from this recognized transmitting device.

4. A data transmit/receive method, in which a plurality of devices which have a data transmission function or a data receiving function and an asynchronous communication function are connected to a bus, and real-time data are transmitted/received between two of said plurality of devices, wherein each of the plurality of devices has its own device-specific information as well as a function for reading other device-specific information;

the method comprising:

if a device having the data transmission function or the data receiving function, the asynchronous communication function, and the reading function but not belonging to said plurality of devices has been added as a transmitting device within a topology showing the connection among said plurality of devices while a device functioning as a receiving device transmits/receives data to/from another transmitting device, said receiving device recognizing with the reading function the transmitting device that had been transmitting data originally; and said receiving device continuing the transmitting/receiving of data to/from this recognized transmitting device.

5. A data transmit/receive method, wherein:

when at least one transmitting device and one receiving device are connected to a bus, the receiving device reads in device-specific device information from said transmitting device, and then the receiving device receives data from the transmitting device via the bus;

when another transmitting device is connected to the bus while the transmitting device and the receiving device transmit/receive data causing a bus reset, the receiving device reads in device-specific information from the transmitting device that is transmitting data, and compares this read-in device-specific information with the previously read-in device-specific information;

if the transmitting device that is transmitting data is different from the transmitting device that had been transmitting data originally, then the receiving device reads out the device-specific information of all devices connected to the bus, compares the device-specific information with the corresponding previously read-in device-specific information, and recognizes the transmitting device that had been transmitting data originally;

then, if the transmitting device that had been transmitting data originally is transmitting data, the receiving device continues the receiving of data from the transmitting device that had been transmitting data originally.

6. The data transmit/receive method according to claim 5, wherein the data that the transmitting device transmits to the receiving device are encrypted;

wherein after receiving the data from the transmitting device, the receiving device obtains decryption information with a device authentication process; and wherein after the receiving device continues the receiving of data from the transmitting device that had been transmitting data originally, the receiving device again obtains decryption information with a device authentication process.

7. The data transmit/receive method according to claim 5, wherein the receiving device stops receiving when the result of comparing the device-specific information of all devices connected to the bus with the previously read-in device-specific information is that the transmitting device of the previously read-in device-specific information is not present.

8. The data transmit/receive method according to claim 5, wherein the bus has a plurality of channels; and wherein when the receiving device has recognized the transmitting device that had been transmitting data originally by comparison of device-specific information, and when the recognized transmitting device has continued transmitting on a channel that is different from the channel on which it had been transmitting originally, then the receiving device continues the receiving on a different channel.

9. A data transmit/receive method, wherein:

when at least one transmitting device and one receiving device are connected to a bus, the receiving device reads in device-specific device information from said transmitting device, and then the receiving device receives encrypted data from the transmitting device via the bus, and obtains decryption information with a device authentication process;

then, when another transmitting device is connected to the bus while the transmitting device and the receiving device transmit/receive data causing a bus reset, the receiving device reads in device-specific information from the transmitting device that is transmitting data, and compares this read-in device-specific information with the previously read-in device-specific information;

if the transmitting device that is transmitting data is different from the transmitting device that had been transmitting data originally, then the receiving device reads out the device-specific information of all devices connected to the bus, compares the device-specific information with the corresponding previously read-in device-specific information, and recognizes the transmitting device that had been transmitting data originally;

then, if the transmitting device that had been transmitting data originally is transmitting data, the receiving device continues the receiving of data from the transmitting device that had been transmitting data originally, and again obtains decryption information with a device authentication process.

* * * * *